(12) United States Patent
Shindo

(10) Patent No.: US 8,160,139 B2
(45) Date of Patent: Apr. 17, 2012

(54) ADAPTIVE QUANTIZER, ADAPTIVE QUANTIZATION METHOD AND ADAPTIVE QUANTIZATION PROGRAM

(75) Inventor: Tomoyuki Shindo, Yokohama (JP)

(73) Assignee: Victor Company of Japan, Ltd., Kanagawa-Ken (JP)

(*) Notice: Subject to any disclaimer, the term of this patent is extended or adjusted under 35 U.S.C. 154(b) by 1452 days.

(21) Appl. No.: 11/710,768

(22) Filed: Feb. 26, 2007

(65) Prior Publication Data

US 2007/0201553 A1 Aug. 30, 2007

(30) Foreign Application Priority Data

Feb. 28, 2006 (JP) ................................ 2006-051532

(51) Int. Cl.
*H04N 7/12* (2006.01)
*H04N 11/02* (2006.01)
*H04N 11/04* (2006.01)

(52) U.S. Cl. ......... 375/240.05; 375/240.02; 375/240.03; 375/240.04; 375/240.06; 375/240.07; 375/240.08

(58) Field of Classification Search .............. 375/240.05
See application file for complete search history.

(56) References Cited

U.S. PATENT DOCUMENTS 5,561,719 A * 10/1996 Sugahara et al. ............. 382/252
6,101,220 A * 8/2000 Ando ............................ 375/240

FOREIGN PATENT DOCUMENTS

| JP | 05-137132 | 6/1993 | .......................... 7/137 |
| JP | 07-095564 | 4/1995 | ............................ 7/24 |

OTHER PUBLICATIONS

Yamaguchi, Hirohisa. Adaptive DCT Coding of Video Signals. Oct. 1993. IEEE Transactions on Communications, vol. 41, No. 10.*

* cited by examiner

*Primary Examiner* — Taghi Arani
*Assistant Examiner* — Narciso Victoria
(74) *Attorney, Agent, or Firm* — Renner, Kenner, Greive, Bobak, Taylor & Weber

(57) ABSTRACT

Activities of a video signal are obtained for subblocks of each macroblock of each picture. The smallest activity is detected as an input-picture activity per macroblock. Obtained are activities of a motion-compensated predictive signal per first picture and activites of the video signal per second picture, for the subblocks of each macroblock. A mean value of the activities is obtained per macroblock for each picture, as an error activity per macroblock. A mean error activity is obtained for error activities per picture. A quantization step size for quantization of the video signal is adjusted per macroblock, according to the input-picture activity, to obtain a smaller step size when the error activity is equal to or larger than the mean error activity than when the former is smaller than the latter.

6 Claims, 2 Drawing Sheets

ADAPTIVE QUANTIZER, ADAPTIVE QUANTIZATION METHOD AND ADAPTIVE QUANTIZATION PROGRAM

CROSS-REFERENCE TO RELATED APPLICATIONS

This application is based on and claims the benefit of priority from the prior Japanese Patent Application No. 2006-051532 filed on Feb. 28, 2006, the entire content of which is incorporated herein by reference.

BACKGROUND OF THE INVENTION

The present invention relates to an adaptive quantizer, an adaptive quantization method and an adaptive quantization program. The present invention particularly relates an adaptive quantizer, an adaptive quantization method and an adaptive quantization program in which a quantization step size is controlled based on activities in pictures under the MPEG (Moving Picture Experts Group Phase 2)-2 specification.

An internationally standardized specification MPEG-2 is a technique for efficiently coding moving pictures carried by video signals, such as TV signals.

The MPEG-2 specification includes two fundamental techniques: motion-compensated prediction and transform coding. The motion-compensated prediction produces prediction errors based on the amount of motion, referred to as motion victors. The motion victors are obtained per macroblock of 16×16 pixels of a picture frame of moving pictures and between a target picture frame to be coded and a reference picture frame temporally apart from the target frame by several frames. The transform coding compresses the amount of data of the prediction errors or the target frame with DCT (Discrete Cosign Transform).

Under the MPEG-2 specification, moving pictures of a video signal are processed per GOP (Group of Pictures): I-pictures (intra-coded pictures), P-pictures (predictive-coded pictures) and B-pictures (bidirectionally predictive-coded pictures). The I-pictures are coded independently, entirely without reference to other pictures. The P-pictures obtain predictions from temporally preceding I- or P-pictures in GOP. The B-pictures obtain predictions from the nearest preceding and/or upcoming I- or P-pictures in GOP.

The I-pictures undergo DCT directly. In contrast, the P- and B-pictures undergo DCT indirectly, or prediction errors undergo DCT, which are obtained from I- or P-pictures through motion-compensated prediction.

Transform coefficients obtained through DCT for these pictures are quantized followed by variable-length coding to the quantized transform coefficients, motion vectors and other additional information, thus a bitstream being obtained. The bitstream is temporarily stored in a buffer before being output.

Adaptive quantization based on visual perception is achieved with a quantization step size obtained based on buffer fullness (the amount of generated codes) and adjusted according to activities detected for pictures carried by an input video signal. The activity indicates that a picture has strong edge portions or other portions where rapid intensity changes occur, or smooth portions where small intensity changes occur.

The quantized transform coefficients undergo dequantization and then inverse-DCT, thus a locally-decoded signal being produced. The locally-decoded signal is added to a motion-compensated predictive signal gained by motion-compensated prediction. The resultant signal is delayed by several frames to be used as a reference picture in motion-compensated prediction for P- and B-picture coding.

The MPEG-2 compliant encoding technique described above is variable-length coding in which the amount of generated codes (bit rate) per unit of time is not constant.

Adaptive quantization provides rate control in which the bit rate is regulated with a quantization scale factor which is adjusted per macroblock.

A known adaptive quantization technique based on visual perception id disclosed, for example, in International Publication No. WO2002/080574. Adaptive quantization is performed based on activities obtained under MPEG-2 TM-5 (Test Model 5), with suppression of mosquito noises in macroblocks having edge portions. Edge and float portions of a picture are processed in the same way under the known technique. Mosquito noises are inevitably almost equally suppressed for the edge and flat portions even if the former has larger noises than the latter. This leads to insufficient suppression of mosquito noises in the edge portion.

Another known adaptive quantization technique based on visual perception is disclosed, for example, in Japanese Unexamined Patent Publication No. 05(1993)-137132. Adaptive quantization is performed based on activities of a picture to be coded and a reference picture, however, no suppression of mosquito noises in edge portions being achieved.

SUMMARY OF THE INVENTION

A purpose of the present invention is to provide an adaptive quantizer, an adaptive quantization method and an adaptive quantization program that achieve suppression of mosquito noises in edge portions of pictures carried by a video signal.

The present invention provides an adaptive quantizer for coding pictures carried by an input video signal, the pictures including first pictures to be coded with motion-compensated prediction and second pictures to be coded with no motion-compensated prediction, comprising: an input-picture activity detector to obtain activities of the input video signal for a plurality of subblocks that compose each of a plurality of macroblocks that compose each picture of the input video signal, detect a smallest activity among the activities and output the smallest activity as an input-picture activity per macroblock; an error activity detector to obtain activities of a motion-compensated predictive signal gained in the motion-compensated prediction per first picture and activities of the input video signal per second picture, for the subblocks of each macroblock, obtain a mean value of the obtained activities per macroblock for each of the first and second pictures, and output the mean value as an error activity per macroblock; an adjustment amount controller to obtain a mean error activity of error activities in each picture and compare the error activity per macroblock with the mean error activity in each picture; and a quantization step-size adjuster to adjust per macroblock a quantization step size to be used in quantization of the video signal, according to the input-picture activity, so that the quantization step size becomes smaller when the error activity is equal to or larger than the mean error activity than when the error activity is smaller than the mean error activity.

Moreover, the present invention provides an adaptive quantization method for coding pictures carried by an input video signal, the pictures including first pictures to be coded with motion-compensated prediction and second pictures to be coded with no motion-compensated prediction, the method comprising the steps of: obtaining activities of the input video signal for a plurality of subblocks that compose each of a plurality of macroblocks that compose each picture of the input video signal; detecting a smallest activity among the activities as an input-picture activity per macroblock; obtaining activities of a motion-compensated predictive signal gained in the motion-compensated prediction per first picture and activities of the input video signal per second picture, for the subblocks of each macroblock; obtaining a mean value of the obtained activities per macroblock for each of the first and second pictures, as an error activity per macroblock; obtaining a mean error activity of error activities in each picture; comparing the error activity per macroblock with the mean error activity in each picture; and adjusting per macroblock a quantization step size to be used in quantization of the video signal, according to the input-picture activity, so that the quantization step size becomes smaller when the error activity is equal to or larger than the mean error activity than when the error activity is smaller than the mean error activity.

Furthermore, the present invention provides a computer program product stored in a computer readable medium for adaptive quantization in coding pictures carried by an input video signal, the pictures including first pictures to be coded with motion-compensated prediction and second pictures to be coded with no motion-compensated prediction, the computer program product comprising instructions to execute the steps of: obtaining activities of the input video signal for a plurality of subblocks that compose each of a plurality of macroblocks that compose each picture of the input video signal; detecting a smallest activity among the activities as an input-picture activity per macroblock; obtaining activities of a motion-compensated predictive signal gained in the motion-compensated prediction per first picture and activities of the input video signal per second picture, for the subblocks of each macroblock; obtaining a mean value of the obtained activities per macroblock for each of the first and second pictures, as an error activity per macroblock; obtaining a mean error activity of error activities in each picture; comparing the error activity per macroblock with the mean error activity in each picture; and adjusting per macroblock a quantization step size to be used in quantization of the video signal, according to the input-picture activity, so that the quantization step size becomes smaller when the error activity is equal to or larger than the mean error activity than when the error activity is smaller than the mean error activity.

DETAILED DESCRIPTION OF PREFERRED EMBODIMENTS

Figure 1:
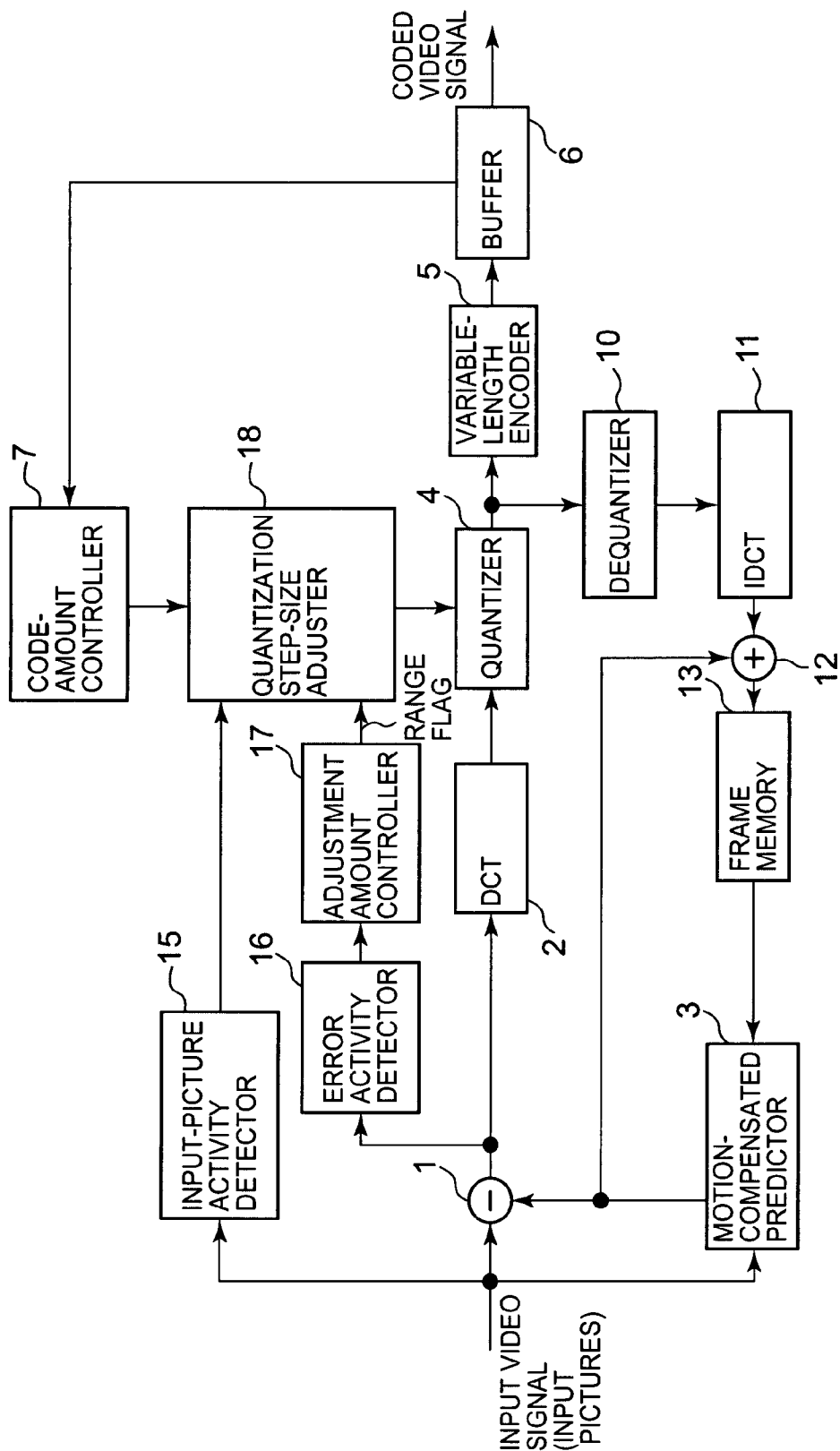
FIG. 1 shows a block diagram of an embodiment of an adaptive quantizer according to the present invention.

FIG. 1 shows a block diagram of an embodiment of an adaptive quantizer installed in a moving-picture encoding apparatus according to the present invention.

An input video signal carrying moving pictures is supplied to a subtractor 1, a motion-compensated predictor 3 and an input-picture activity detector 15.

Each moving picture carried by the input video signal and input to the moving-picture encoding apparatus is referred to as an input picture or frame in the following disclosure.

The input video signal is supplied to a DCT unit 2 through the subtractor 1 and undergoes DCT. When an input frame carried by the input video signal is an I-picture, it passes the subtractor 1 and undergoes DCT. In contrast, when an input frame carried by the input video signal is a P- or B-picture, subjected to DCT is a predictive error signal produced at the subtractor 1.

The predictive error signal is produced at the subtractor 1 by subtracting a motion-compensated predictive signal from the input video signal. The motion-compensated predictive signal is produced at the motion-compensated predictor 3 by motion-compensated prediction with the input video signal and a locally-decoded video signal supplied by a frame memory 13.

Transform coefficients obtained at the DCT unit 2 are quantized by a quantizer 4 followed by variable-length coding at a variable-length encoder 5 to the quantized transform coefficients, motion vectors and other additional information, thus a bitstream being produced. The bitstream is temporarily stored in a buffer 6 before being output as a coded video signal.

The transform coefficients quantized at the quantizer 4 undergo dequantization and then inverse-DCT, at a dequantizer 10 and an inverse-DCT unit 11, respectively, thus a locally-decoded signal being produced. The locally-decoded signal is supplied to an adder 12. Also supplied to the adder 12 is the motion-compensated predictive signal gained at the motion-compensated predictor 3. The signals are added to each other at the adder 12. The resultant signal is stored in the frame memory 13 and delayed by several frames to be used as a reference picture in motion-compensated prediction of P- and B-pictures.

Disclosed below is adaptive quantization, the feature of the present invention.

When the input video signal is supplied to the input-picture activity detector 15, the detector 15 obtains an activity (input-picture activity) of a luminance signal component of the video signal for each DCT block of 8×8 pixels in the horizontal and vertical scanning directions, respectively. The activity can be obtained with a technique employed in MPEG-2 TM-5. The activity is a positive integer which becomes smaller as luminance variation becomes smaller (when an input picture is flat) whereas becomes larger as luminance variation becomes larger (when an input picture has an edge portion).

The input-picture activity detector 15 works for each macroblock of the input video signal. Each macroblock consists of 16×16 pixels in the horizontal and vertical scanning directions, respectively. The detector 15 obtains four activities for four DCT blocks of 8×8 pixels and outputs the smallest activity, as an input-picture activity (an activity of an input picture carried by the input video signal) per macroblock.

When the output signal (an I-picture itself or a predictive error for a P- or B-picture) of the subtractor 1 is supplied to an error activity detector 16, the detector 16 obtains an activity of a luminance signal component of the output signal for each DCT block of 8×8 pixels, like the input-picture activity detector 15. The detector 16 also works for each macroblock of the output signal, thus obtaining four activities but outputting a mean value of the four activities as an error activity. The mean value depends on whether a picture is flat or has an edge portion which will be discussed later. Thus, the mean value can be used in determination as to whether an input picture is a flat one or has an edge portion.

Each error activity is supplied from the error activity detector 16 to an adjustment amount controller 17. The controller 17 adds error activities for one picture and divides the sum by the number of macroblocks of the picture, thus obtaining a mean error activity for each picture type (I-, P- or B-picture). Mean error activities for the three picture types are stored in the controller 17. Used at the beginning of encoding is a mean activity of the same picture type as an input picture.

The adjustment amount controller 17 compares each input error activity with the mean error activity of the same picture type as that for which the error activity has been obtained. The controller 17 sets a flag RangeFlag to "1" when the input error activity is equal to or larger than the mean error activity whereas to "0" when the former is smaller than the latter. The RangeFlag "1" or "0" is used for quantization step-size adjustments at a quantization step-size adjuster 18, as described below.

The quantization step-size adjuster 18 performs adjustments to a quantization step size supplied by a code-amount controller 7, according to the RangeFlag and an input-picture activity of a luminance signal component of the input video signal gained at the input-picture activity detector 15. The controller 7 decides the quantization step size depending on the buffer fullness (the amount of generated codes) at the buffer 6.

The quantization step-size adjuster 18 obtains an adjusting amount Nact according to the expression (1) shown below:

$$N\text{act} = (K \times O\text{act} + \text{avg\_act})/(O\text{act} + K \times \text{avg\_act}) \quad (1)$$

where Oact is an input-picture activity, avg_act is a mean input-picture activity, and K is a first constant at RangeFlag "1" whereas a second constant at RangeFlag "0". The first constant and the second constant are different from each other, which may be 4 and 2, respectively, or 3 and 2, respectively.

The mean input-picture activity avg_act is a mean activity per picture obtained at the quantization step-size adjuster 18. It is obtained by adding per-macroblock input-picture activities for one picture and dividing the sum by the number of macroblocks of the picture.

Then, the quantization step-size adjuster 18 obtains a quantization step size Mquant according to the expression (2) shown below:

$$M\text{qunat} = Qj \times N\text{act} \quad (2)$$

where Qj is a quantization step size supplied from the code-amount controller 7, decided according to the buffer fullness (the amount of generated codes) at the buffer 6.

The quantization step size Mquant given by the expression (2) is then supplied to the quantizer 4 for quantization of DCT coefficients supplied from the DCT 2.

The adaptive quantization disclosed above will be explained more with illustrations shown in FIG. 2.

Figure 2:
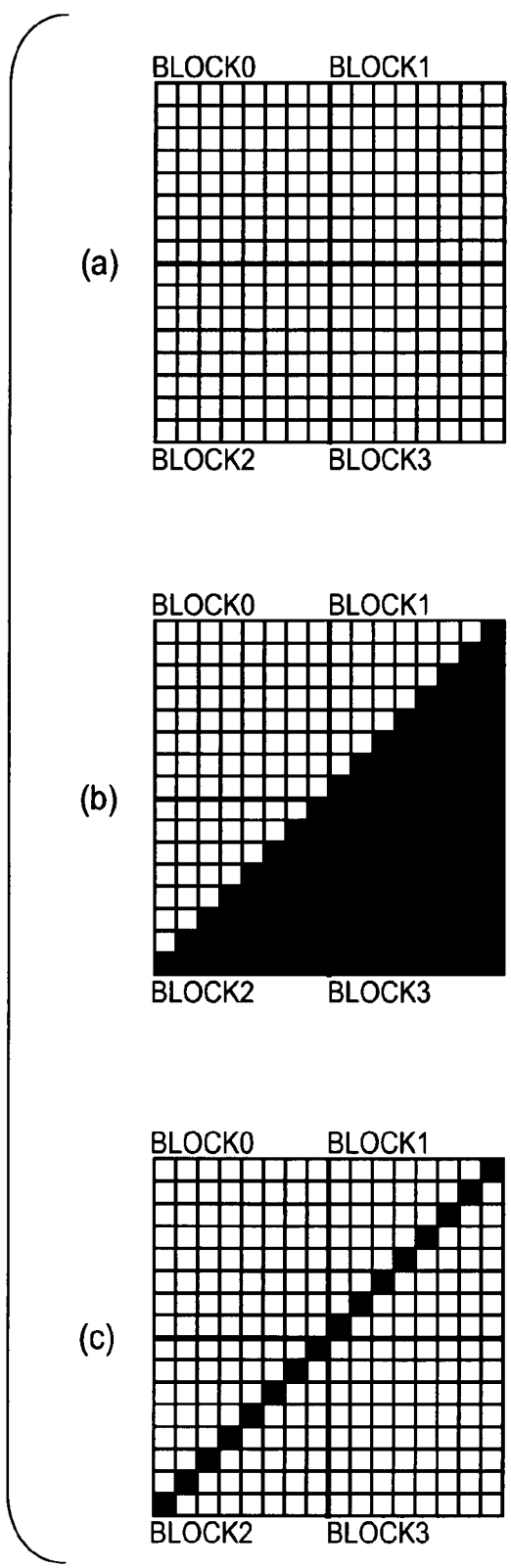
FIG. 2 shows illustrations explaining adaptive quantization according to the present invention.

In illustrations in (a), (b) and (c) of FIG. 2, white pixels carry a value "0" whereas black pixels a value "128" in each macroblock of the input picture. Each macroblock consists of four DCT blocks (subblocks): block0, block1, block2 and block3.

Explained first is the case in which an I-picture is encoded. In this case, the input picture and the predictive-error picture are identical to each other.

Illustrated in (a) of FIG. 2 is a flat input image in which all of the pixels carry the value "0" in the macroblock of the DCT blocks block0, block1, block2 and block3.

For such a picture illustrated in (a) of FIG. 2, an input-picture activity Qact_A and an error activity Eact_A are given as follows:

Qact_A=1
Eact_A=1

The input-picture and error activities are obtained with the technique employed in MPEG-2 TM-5, the same being applied to the following disclosure.

Illustrated in (b) of FIG. 2 is an input image with an edge portion in which each pixel carries the value "0" in the left-upper half of the macroblock (all of the pixels in block0 and the left-upper-half pixels in block1 and block2) whereas the other each pixel carries the value "128" in the right-lower half of the macroblock (all of the pixels in block3 and the right-lower-half pixels in block1 and block2).

For such a picture illustrated in (b) of FIG. 2, an input-picture activity Qact_B and an error activity Eact_B are given as shown below:

Qact_B=1
Eact_B=2017

The error activity is "0" in block0 and block3 whereas "4032" in block1 and block2.

Accordingly, in a flat image and an image with an edge portion, such as, illustrated in (a) and (b), respectively, of FIG. 2, although the input-picture activity is the same, the error activity is very different from each other.

As described before, the adjustment amount controller 17 compares each input error activity with the mean error activity of the same picture type as that for which the error activity has been obtained. The controller 17 sets a flag RangeFlag to "1" when the input error activity is equal to or larger than the mean error activity, for wider step-size adjustments at the quantization step-size adjuster 18. In contrast, the controller 17 sets a flag RangeFlag to "0" when the former is smaller than the latter.

The flag RangeFlag "1" or "0" is supplied to the quantization step-size adjuster 18. When the mean value of the error activity is equal to or smaller than Eact_B, the adjuster 18 is controlled at RangeFlag "0" when the input picture is an I-picture of a flat image illustrated in (a) of FIG. 2 whereas controlled at RangeFlag "1" when the input picture is an I-picture carrying an edge portion illustrated in (b) of FIG. 2.

When the mean input-picture activity avg_act is "2", an adjusting amount NactA for an input I-picture illustrated in (a) of FIG. 2 and another adjusting amount NactB for an input I-picture illustrated in (b) of FIG. 2 are given as shown below, according to the expression (1).

$$N\text{act}A = (2 \times 1 + 2)/(1 + 2 \times 2) = 4/5 = 0.8$$

$$N\text{act}B = (4 \times 1 + 2)/(1 + 4 \times 2) = 6/9 = 0.66$$

The quantization step size Mquant obtained at the quantization step-size adjuster 18 is proportional to the adjusting amount Nact (NactA, NactB) according to the expression (2). Thus, the quantization step size at the quantizer 4 is adjusted by the adjuster 18 so that it is smaller for an I-picture carrying an edge portion illustrated in (b) of FIG. 2 than for an I-picture of a flat image illustrated in (a) of FIG. 2.

Explained next is the case in which a P- or B-picture is encoded. In this case, the input picture and the predictive-error picture are different from each other. A flat predictive-error picture has a smaller error. In contrast, a predictive-error picture with an edge portion tends to have a larger error around the edge portion.

Illustrated in (a) and (b) of FIG. 2 are also a flat input image and an input image with an edge portion, respectively, for a P- or B-picture, like an I-picture explained above. Illustrated in (c) of FIG. 2 is a predictive-error picture with an edge portion for a P- or B-picture.

For such a picture illustrated in (a) of FIG. 2, an input-picture activity Qact_A and an error activity Eact_A are given as follows:

Qact_A=1
Eact_A=1

For such a picture illustrated in (b) of FIG. 2, an input-picture activity Qact_B and an error activity Eact_B are given as shown below:

Qact_B=1
Eact_B=897

The error activity is "0" in block0 and block3 whereas "1792" in block1 and block2.

Accordingly, in a flat image and an image with an edge portion, such as, illustrated in (a) and (b), respectively, of FIG. 2, although the input-picture activity is the same, the error activity is very different from each other, for a P- or B-picture, like discussed for an I-picture.

When the mean value of the error activity is equal to or smaller than Eact_B, the adjuster 18 is controlled at Range-Flag "0" when the input picture is a P- or B-picture of a flat image illustrated in (a) of FIG. 2 whereas controlled at Range-Flag "1" when the input picture is a P- or B-picture carrying an edge portion illustrated in (b) of FIG. 2, like described for an I-picture.

When the mean input-picture activity avg_act is "2", an adjusting amount NactA for an input I-picture illustrated in (a) of FIG. 2 and another adjusting amount NactB for an input I-picture illustrated in (b) of FIG. 2 are given as shown below, according to the expression (1).

$$NactA=(2\times 1+2)/(1+2\times 2)=4/5=0.8$$

$$NactB=(4\times 1+2)/(1+4\times 2)=6/9=0.66$$

The quantization step size Mquant obtained at the quantization step-size adjuster 18 is proportional to the adjusting amount Nact (NactA, NactB) according to the expression (2). Thus, the quantization step size at the quantizer 4 is adjusted by the adjuster 18 so that it is smaller for a P- or B-picture carrying an edge portion illustrated in (b) of FIG. 2 than for a P- or B-picture of a flat image illustrated in (a) of FIG. 2, like described for an I-picture.

For the entire macroblocks, as an input-picture activity becomes larger, an error activity becomes larger for I-pictures due to the fact that the input and predictive-error pictures are identical to each other for I-pictures, thus the quantization step size being adjusted larger in this invention than the known techniques. Likewise, as an input-picture activity becomes larger, an error activity becomes larger for P- or I-pictures when an image is deformed, rotating, etc., thus the quantization step size being adjusted larger in this invention than the known techniques.

Moreover, as the quantization step size is adjusted larger for target DCT blocks, the generated code amount becomes smaller, hence the code-amount controller 7 generates smaller step sizes for other DCT blocks including a DCT block having an edge portion, thus suppressing mosquito noises at the edge portion for higher image quality.

Not only with the embodiment shown in FIG. 1, the present invention can achieve adaptive quantization described above with a computer software program (an adaptive quantization program). The software program may be stored in a storage medium and installed in a computer or downloaded to a computer through a communications network.

As disclosed above in detail, according to the present invention, an quantization step size decided based on an input-picture activity is adjusted smaller when an error activity is equal to or larger than a mean error activity than when the former is smaller than the latter.

The adjustments offer a smaller quantization step size to quantization of a picture having an edge portion with a large luminance variation in which an error activity is equal to or larger than a mean error activity, thus suppressing mosquito noises at the edge portion for higher image quality.

What is claimed is:

1. An adaptive quantizer for coding pictures carried by an input video signal, the pictures including first pictures to be coded with motion-compensated prediction and second pictures to be coded with no motion-compensated prediction, comprising:

an input-picture activity detector to obtain activities of the input video signal for a plurality of subblocks that compose each of a plurality of macroblocks that compose each picture of the input video signal, detect a smallest activity among the activities and output the smallest activity as an input-activity per macroblock;

an error activity detector to obtain activities of a motion-compensated predictive signal gained in the motion-compensated prediction per first picture and activities of the input video signal per second picture, for the subblocks of each macroblock, obtain a mean value of the obtained activities per macroblock for each of the first and second pictures, and output the mean value as an error activity per macroblock;

an adjustment amount controller to obtain a mean error activity of error activities in each picture and compare the error activity per macroblock with the mean error activity in each picture; and a quantization step-size adjuster to adjust per macroblock a quantization step size to be used in quantization of the video signal, according to the input-picture activity, so that the quantization step size becomes smaller when the error activity is equal to or larger than the mean error activity than when the error activity is smaller than the mean error activity.

2. The adaptive quantizer according to claim 1, wherein:

the adjustment amount controller sets a first flag when the error activity is equal to or larger than the mean error activity whereas a second flag different from the first flag when the error activity is smaller than the mean error activity; and the quantization step-size adjuster obtains an adjusting amount Nact and a quantization step size Mquant according to expressions (1) and (2), respectively, shown below:

$$Nact=(K\times Oact+avg\_act)/(Oact+K\times avg\_act) \quad (1)$$

where Oact is each input-picture activity of the input video signal, avg_act is a mean activity of the input video signal obtained by adding per-macroblock activities of the input video signal for each picture and dividing a sum of the per-macroblock activities by a predetermined number of the macroblocks of each picture, and K is a first constant at the first flag whereas a second constant at the second flag, the first constant and the second constant being different from each other, and $$Mquant=Qj\times Nact \quad (2)$$

where Qj is a quantization step size decided according to an amount of generated codes.

3. An adaptive quantization method for coding pictures carried by an input video signal, the pictures including first pictures to be coded with motion-compensated prediction and second pictures to be coded with no motion-compensated prediction, the method comprising the steps of:

obtaining activities of the input video signal for a plurality of subblocks that compose each of a plurality of macroblocks that compose each picture of the input video signal;

detecting a smallest activity among the activities as an input-picture activity per macroblock;

obtaining activities of a motion-compensated predictive signal gained in the motion-compensated prediction per first picture and activities of the input video signal per second picture, for the subblocks of each macroblock;

obtaining a mean value of the obtained activities per macroblock for each of the first and second pictures, as an error activity per macroblock;

obtaining a mean error activity of error activities in each picture;

comparing the error activity per macroblock with the mean error activity in each picture; and adjusting per macroblock a quantization step size to be used in quantization of the video signal, according to the input-picture activity, so that the quantization step size becomes smaller when the error activity is equal to or larger than the mean error activity than when the error activity is smaller than the mean error activity.

4. The adaptive quantization method according to claim 3, wherein:

the comparing step includes the step of setting a first flag when the error activity is equal to or larger than the mean error activity whereas a second flag different from the first flag when the error activity is smaller than the mean error activity; and the adjusting step includes the step of obtaining an adjusting amount Nact and a quantization step size Mquant according to expressions (1) and (2), respectively, shown below:

$$N\text{act}=(K \times O\text{act}+\text{avg\_act})/(O\text{act}+K \times \text{avg\_act}) \quad (1)$$

where Oact is each input-picture activity of the input video signal, avg_act is a mean activity of the input video signal obtained by adding per-macroblock activities of the input video signal for each picture and dividing a sum of the per-macroblock activities by a predetermined number of the macroblocks of each picture, and K is a first constant at the first flag whereas a second constant at the second flag, the first constant and the second constant being different from each other, and $$M\text{quant}=Qj \times N\text{act} \quad (2)$$

where Qj is a quantization step size decided according to an amount of generated codes.

5. A computer program product stored in a non-transitory computer readable medium for adaptive quantization in coding pictures carried by an input video signal, the pictures including first pictures to be coded with motion-compensated prediction and second pictures to be coded with no motion-compensated prediction, the computer program product comprising instructions to execute the steps of:

obtaining activities of the input video signal for a plurality of subblocks that compose each of a plurality of macroblocks that compose each picture of the input video signal;

detecting a smallest activity among the activities as an input-picture activity per macroblock;

obtaining activities of a motion-compensated predictive signal gained in the motion-compensated prediction per first picture and activities of the input video signal per second picture, for the subblocks of each macroblock;

obtaining a mean value of the obtained activities per macroblock for each of the first and second pictures, as an error activity per macroblock;

obtaining a mean error activity of error activities in each picture;

comparing the error activity per macroblock with the mean error activity in each picture; and adjusting per macroblock a quantization step size to be used in quantization of the video signal, according to the input-picture activity, so that the quantization step size becomes smaller when the error activity is equal to or larger than the mean error activity than when the error activity is smaller than the mean error activity.

6. The computer program product according to claim 5, wherein:

the comparing step includes the step of setting a first flag when the error activity is equal to or larger than the mean error activity whereas a second flag different from the first flag when the error activity is smaller than the mean error activity; and the adjusting step includes the step of obtaining an adjusting amount Nact and a quantization step size Mquant according to expressions (1) and (2), respectively, shown below:

$$N\text{act}=(K \times O\text{act}+\text{avg\_act})/(O\text{act}+K \times \text{avg\_act}) \quad (1)$$

where Oact is each input-picture activity of the input video signal, avg_act is a mean activity of the input video signal obtained by adding per-macroblock activities of the input video signal for each picture and dividing a sum of the per-macroblock activities by a predetermined number of the macroblocks of each picture, and K is a first constant at the first flag whereas a second constant at the second flag, the first constant and the second constant being different from each other, and $$M\text{quant}=Qj \times N\text{act} \quad (2)$$

where Qj is a quantization step size decided according to an amount of generated codes.

* * * * *